United States Patent [19]

Zielinsky et al.

[11] Patent Number: 5,422,404

[45] Date of Patent: Jun. 6, 1995

[54] POLYMER MODIFIED GUMS

[75] Inventors: Ronald E. Zielinsky; Mark J. Seabury, both of Fort Wayne, Ind.

[73] Assignee: PolyMod Technologies, Inc., Fort Wayne, Ind.

[21] Appl. No.: 112,598

[22] Filed: Aug. 20, 1993

[51] Int. Cl.$^6$ ............................................. C08F 8/22
[52] U.S. Cl. ............................ 525/356; 525/326.4; 525/329.3; 525/329.7; 525/331.2; 525/331.7; 525/332.8; 525/332.9; 525/333.1; 525/333.2; 525/334.1; 525/436; 525/437; 525/450; 525/452
[58] Field of Search ............... 525/356, 436, 437, 450, 525/452

[56] References Cited

U.S. PATENT DOCUMENTS

| | | |
|---|---|---|
| 2,129,289 | 9/1938 | Soll ........................................ 525/356 |
| 2,497,046 | 2/1950 | Kropa . |
| 3,992,221 | 11/1976 | Homsy et al. . |
| 4,020,223 | 4/1977 | Dixon et al. . |
| 4,076,916 | 2/1978 | Lagow . |
| 4,144,374 | 3/1979 | Lagow et al. . |
| 4,336,015 | 6/1982 | Rainville . |
| 4,404,256 | 9/1983 | Anand et al. . |
| 4,593,050 | 6/1986 | Cohen et al. . |
| 4,617,077 | 10/1986 | Giese et al. . |
| 4,621,107 | 11/1986 | Lagow et al. . |
| 4,764,405 | 8/1988 | Bauman et al. . |
| 4,800,053 | 1/1989 | Bauman et al. . |
| 4,830,810 | 5/1989 | Ufer et al. . |
| 4,900,793 | 2/1990 | Lagow . |
| 5,093,432 | 3/1992 | Bierschenk et al. ............... 525/356 |
| 5,214,102 | 5/1993 | Zielinski et al. . |

Primary Examiner—Bernard Lipman
Attorney, Agent, or Firm—Poms, Smith, Lande & Rose

[57] ABSTRACT

A method for producing a modified gum by direct fluorination of a polymer gum. The polymer gum must be substantially uncross-linked prior to fluorination. The degree of fluorination is controlled to provide fluorinated gums having different degrees of fluorine uptake and available cross-linking sites. The resulting modified gum can be cured alone or in combination with one or more supplemental polymers to form a wide variety of elastomeric articles. Additives, such as fillers, lubricants and plasticizers may also be combined with the modified gum and added polymers during compounding and final curing.

6 Claims, 4 Drawing Sheets

POLYMER MODIFIED GUMS

BACKGROUND OF THE INVENTION

1. Field of the Invention

The present invention relates generally to polymer gums and methods for modifying such gums by direct fluorination with fluorine. More particularly, the present invention relates to the fluorination of uncross-linked gums to provide novel fluorinated gums which may be used in the fabrication of a wide variety of polymeric compounds and materials.

2. Description of Related Art

Elastomers are typically polymeric materials possessing an inherent property known as elasticity which allows them to return to their original form when released from a deforming load and which are capable of a substantial degree of stretching under tension before breaking. Elastomers are used in a wide range of applications which include (but are not limited to): Static and dynamic seals, couplings, rollers, bearings, bushings, diaphragms, gears and shock absorbers. In these and other applications, the elastomer is frequently subjected to a variety of hostile conditions and environments which often compromise its performance. For example, the elastomer may be exposed to high temperatures, high pressures, corrosive fluids, and abrasive media, all of which can limit the usefulness of an elastomer in such an environment. In addition, elastomers tend to exhibit high inherent friction and poor wear characteristics which can result in uneven performance and again limit their usefulness in certain applications.

Several methods of improving some of these undesirable properties are currently used in industry. For example, to counter the poor abrasion resistance of certain elastomers it is common to add to the elastomer formulation what is referred to as a "process aid" or "internal lubricant". During operation, a lubricative layer is formed between the elastomer and mating surface, which lowers friction and, to some extent, increases wear life. Another common technique is to coat the finished elastomeric articles with a thin layer of polytetrafluoroethylene (PTFE) which can improve the friction characteristics of the article and if it does not wear away, can offer some improvement in chemical resistance by acting as a barrier.

However, the benefits which arise from these and other techniques are generally only short term in that the root of the problem 13 i.e. the structure of the elastomeric polymer—is not addressed. As soon as the coating or additive wears away or leaches out of the article, the problem returns.

It would be highly desirable, therefore, to provide polymer compositions that can be used to make elastomeric articles which can withstand aggressive environments for extended periods of time. The polymer compositions should be amenable to use alone or in combination with other polymers to provide a wide variety of polymeric materials. Further, the polymer compositions should be compatible with conventional fillers, plasticizers and other additives so that the various physical characteristics of the final elastomeric article can be tailored to meet specific operational requirements within the aggressive environment.

SUMMARY OF THE INVENTION

The present invention provides a new type of polymer gum which is well-suited for use in aggressive environments. The polymer gum may be used alone or in combination with other polymers and additives. The polymer gums of the present invention are fluorinated gums that are prepared by direct fluorination of suitable polymers while they are uncross-linked. It was discovered that the direct fluorination of uncross-linked polymers results in a permanent change in both the polymer structure and the inherent physical properties of the resulting fluorinated gum. These changes in the fluorinated gum render it useful for compounding articles that are well-suited for exposure to aggressive environments. The method for producing the fluorinated gums in accordance with the present invention involves treating an essentially uncross-linked polymer with fluorine to fluorinate at least a portion of the reactive sites. The degree of fluorination is controlled depending upon the intended final use of the fluorinated gum.

As a feature of the present invention, the degree of fluorination can be limited to preserve reactive sites. The preserved reactive sites are used for cross-linking of the fluorinated gum during final curing. This feature is especially useful when making compositions consisting mainly of the cured fluorinated gum and any desired fillers.

As another feature of the present invention, the degree of fluorination can be controlled to provide perfluorination, i.e., complete fluorination of reactive sites. In these cases, the resulting perfluorinated gum is usually compounded with additional polymers to produce a wide variety of articles. Various fillers, plasticizers and other additives may be included along with the added polymers to impart desired characteristics to the resulting cured article.

The above described and many other features and attendant advantages of the present invention will become better understood by reference to the following detailed description when taken in conjunction with the accompanying drawings.

DETAILED DESCRIPTION OF THE INVENTION

Figure 1:
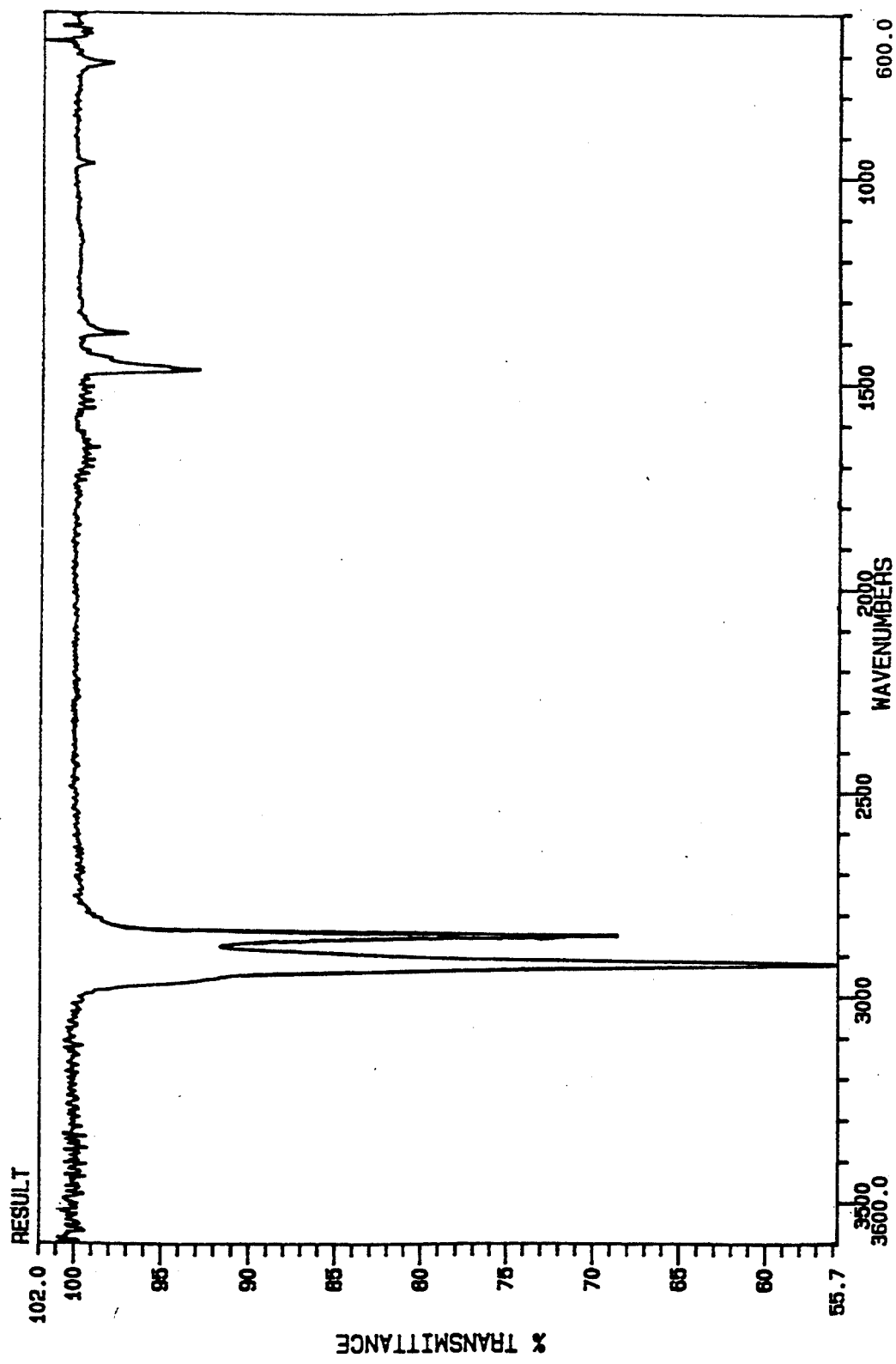
FIG. 1 is an infra-red spectra of an uncross-linked ethylene propylene diene (EPDM) polymer gum prior to fluorination in accordance with the present invention.

The present invention involves procedures for chemically modifying the structure of uncross-linked polymer gums, to effect a permanent change in their inherent chemical and physical properties. The method involves contacting uncured, i.e., uncross-linked, polymer gum with gaseous fluorine under controlled conditions. The fluorination is preferably conducted in the presence of a hydrogen fluoride scavenger. This process modifies the chemical structure of the uncross-linked polymer so that it becomes fluorinated at some or all of the reactive cross-linking sites.

For a polymer to be amenable to the process, it should possess a backbone chain which is essentially hydrocarbon in nature, i.e. primarily composed of carbon atoms to which are attached a plurality of hydrogen atoms. Other substituent groups may also be present on the backbone chain and will depend on the class and type of polymer considered. The term "backbone chain" is routinely used and understood by those skilled in the art of polymer chemistry.

When the polymer gum is contacted with fluorine gas, a chemical reaction takes place in which hydrogen atoms attached to the polymer chain are substituted by fluorine atoms, i.e. the polymer becomes "fluorinated". Hydrogen fluoride (HF) is generated as a by-product of this reaction. For example:

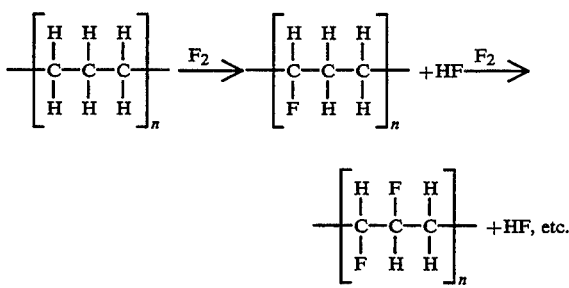

When all replaceable atoms have been substituted with fluorine atoms, "perfluorination" of the polymer is said to have taken place.

The reaction of hydrocarbon-based polymers with fluorine is very rapid and exothermic and must be performed under carefully controlled conditions. The reaction occurs only where the polymer comes in physical contact with gaseous fluorine. Polymer gums exposed to fluorine are therefore fluorinated from the outside inwardly so that, initially, fluorination occurs only at those surfaces immediately exposed. Subsequent reaction takes place below the surface. The depth of penetration by fluorine into the polymer gum will vary with the type of polymer considered and is also governed by temperature, pressure, fluorine concentration, duration of reaction, and surface area of the polymer gum.

In one embodiment of the invention, it is preferred that the surface area of the polymer gum be greatly increased by grinding it into fine particles prior to exposure to the fluorine. This greatly increases the efficiency of the process and permits a more rapid uptake of fluorine into the polymer. Comminuting the gum in this manner permits the preparation of polymers having high fluorine content without the necessity of using high temperatures, pressures, fluorine concentrations, or prolonged reaction times, which can result in a high degree of chain scission in addition to the desired fluorination reaction. Scission is the rupture of backbone bonds in the polymer chain and is detrimental to the desired reaction as it involves the fragmentation of the polymer backbone. Excessive backbone fragmentation ultimately results in degradation of the polymer.

Uncross-linked polymers which are suitable for modification in accordance with the present invention need not necessarily be completely hydrocarbon in nature. The polymer backbone should, however, contain enough hydrocarbon character (i.e. sufficient replaceable aliphatic carbon-hydrogen bonds) that reaction with fluorine will result in the formation of sufficient carbon-fluorine bonds so that the polymer's physical properties are improved. Backbone chains which contain other groups or atoms in addition to carbon or possess pendant groups attached to the backbone may also be suitable for fluorine modification by the inventive process. However, these atoms or groups should not interfere with the process or react unfavorably with fluorine so as to promote excessive degradation or fragmentation of the polymer backbone. Generally speaking, the suitability of any given polymer to direct fluorination via the processes disclosed in this invention and the physical properties of the fluorinated polymers so generated, may be established through routine experimentation by those skilled in the art.

The method of the present invention provides for the fluorination for all classes and types of suitable uncross-linked elastomeric polymers. The process is sufficiently sensitive so as to permit the degree of fluorination of uncross-linked polymer to be controlled. Consequently, fluorinated polymer gums which range in fluorine content from very low to very high weight percents may be generated. The method also provides for the perfluorination of elastomeric polymers. However, the substitution of all the replaceable atoms in a given uncross-linked polymer with fluorine atoms, though theoretically possible, is very difficult to achieve in practice and the experimental conditions required would likely result in excessive scission of the polymer backbone.

In another embodiment of the invention, it is preferred that, for polymers that have been designed to be cross-linked during final cure, that sufficient cross-linking sites remain that the elastomer retains the ability to be cross-linked after the fluorination procedure is complete. The reaction of elemental fluorine with any hydrocarbon-based elastomeric polymer will inevitably result in the loss, through the creation of carbon-fluorine bonds, of cross-linking sites. For example, in EPDM-type polymers, loss of the carbon-carbon double bond through reaction with fluorine results in the loss of a cross-linking site. For example:

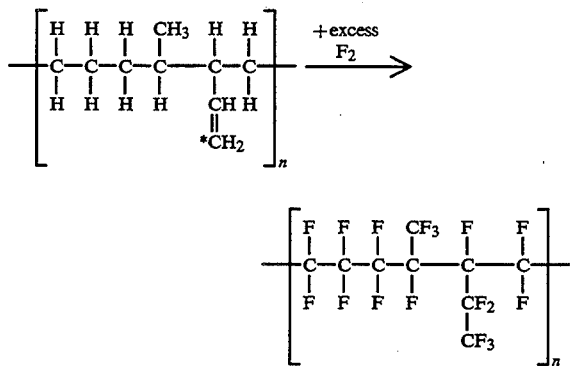

*cross-linking or reactive site

The higher the weight percent of fluorine added to any given polymer, the greater the potential for increased loss of cross-linking sites. To a certain extent, this loss in cross-linking sites can be compensated for when the elastomer is compounded for final curing. For example, the lack of cross-linking capability can be overcome by formulating the fluorinated polymer gum with a more reactive curing agent or by using more aggressive cure conditions. In certain circumstances, it may be desirable to extensively fluorinate a particular polymer gum. This results in the removal of a high proportion of the available cross-linking sites. Such fluorinated polymer gums are more effectively cross-linked by blending with, for example, a small quantity of the unfluorinated parent elastomer or other suitable polymer and then curing the blend as required.

The precise fluorination conditions used to modify any given polymer gum by the methods of this invention will depend on a number of factors. These include the type or class of polymer to be fluorinated, the quantity of polymer, its surface area-to-volume ratio, its reactivity towards fluorine, and the degree of fluorination desired. The process conditions used should be optimized so that a minimum of polymer degradation occurs along with the desired fluorination reaction. This may be done by routine experimentation by those skilled in the art.

As discussed above, the method of this invention is based on the direct fluorination of elastomeric polymer gums using fluorine gas as the preferred fluorinating agent. The phrase "polymer gum" is intended to mean that the elastomer to be fluorinated is completely un-cross-linked and has no curing agents added to it, i.e., the polymer gum consists essentially of uncross-linked polymers. Polymer systems that are partially cured are not preferred; however, they are also suitable for modification by the inventive process and are within the scope of the invention.

The fluorination procedure may be performed in a number of ways. The preferred method requires placing the polymer gum into a suitable reactor vessel and exposing it to fluorine gas. The process liberates HF as the polymer is fluorinated. HF is an undesirable by-product since it may interfere with the fluorination process and/or degrade the material. It is preferably removed from the process by adding a suitable "scavenger", such as sodium fluoride (NaF), to the reactor vessel. The scavenger reacts with HF to produce sodium bifluoride ($NaF + HF \rightarrow NaHF_2$) which is relatively benign to the process.

Preferably, the reactor vessel is purged and filled with an inert gas, such as nitrogen or helium, prior to commencing the fluorination reaction. This will minimize the generation of acid fluoride groups and their carboxylic acid hydrolysis products in the modified polymer by excluding oxygen from the reaction medium. For the same reasons, traces of moisture should also be removed from the reaction medium.

The fluorine gas used in this procedure will preferably be diluted with nitrogen or helium before it enters the reaction vessel. The fluorine content of this "process gas" may range from trace amounts, such as 0.1% to 100% depending on the polymer gum, the state of the reaction, and the desired weight percent of fluorine in the product. Since the process is very exothermic, the fluorine content of the process gas mixture must be carefully controlled. Excessive exposure to fluorine, particularly at the start of a reaction, can cause the polymer gum to ignite. For most applications therefore, the reaction is typically started with a process gas mixture containing low concentrations of fluorine (approximately 2-20%). The fluorine content of the process gas is subsequently gradually increased as dictated by the particular polymer gum and the desired fluorine content in the product.

A variety of fluorine reaction vessel designs are suitable for carrying out the invention, which vessel designs are well known to those skilled in the art. Preferred examples include magnetically- or mechanically-stirred bomb-type vessels and rotating drum reactors. Suitable materials for reactor vessel construction include monel, inconel, hastelloy, brass, stainless steel, or any other metal not subject to corrosion by fluorine under the operating conditions employed in the inventive process.

The fluorination reaction must be performed under carefully controlled conditions so that fluorination of the polymer gum is achieved without significant scission of the polymer backbone. Specifically, the temperature, pressure, fluorine concentration and flow rate, and duration of reaction must all be carefully monitored. Preferably, flow rates of fluorine and nitrogen gases used in the process are controlled and measured by mass flow controllers. Use of these devices allows one to accurately manipulate the fluorine concentration in the process gas mixture and control its rate of delivery to the reactor vessel. Technical grade (97% or better) fluorine and Ultra Pure Carrier grade (i.e. having a measured dew point $\leq -105°F$.) nitrogen are the preferred reagents for this process. However, other grades of fluorine and nitrogen may also be used. For example, fluorine pre-diluted with nitrogen or helium may be used in place of technical grade fluorine. However, the use of such mixtures may not be desirable in circumstances where high fluorine levels are necessary.

Preferably, the polymer gum to be fluorinated is placed in the reactor vessel with a hydrogen fluoride scavenger. Finely divided, anhydrous sodium fluoride is the preferred scavenger, although other scavengers such as potassium fluoride may also be used with favorable results. The quantity of sodium fluoride used should be at least sufficient to react with all the HF formed in the reaction. For any given reaction, this can be estimated beforehand, since one mole of fluorine will react with any hydrocarbon-based polymer to generate, ideally, one mole of HF which will in turn require one mole of sodium fluoride to neutralize it. It is recommended that at least 50% more than the calculated minimum sodium fluoride be used in all reactions.

It is preferred that the polymer gum be in close physical contact with the scavenger during the fluorination process. This optimizes the scavenging process. This may be done, for example, by stirring the gum in a bed of powdered sodium fluoride or by tumbling the gum with the scavenger in a rotating drum-type vessel.

For most applications, it is also preferred that, for solid polymer gums, the gum be finely divided prior to starting the fluorination process. Since the desired reaction takes place only where the polymer comes in physical contact with the process gas, increasing the surface area-to-volume ratio greatly increases the efficiency of the process and permits a more rapid uptake of fluorine by the polymer. The polymer gum may be finely divided using a variety of techniques known to those skilled in the art of rubber chemistry. These include grinding, grating, and cryogenic pulverizing. Certain polymer gums, especially those of low molecular weight or low viscosity, tend to flow or creep once they have been ground up, effectively reversing the effects of the grinding process. However this process may be retarded somewhat by co-grinding the polymer gum with the scavenger. This coats the gum particles with scavenger as they are formed, thereby effectively retarding the agglomeration process.

Once the reactor vessel has been loaded, it is preferably purged with UPC grade nitrogen (or other inert gas) for a sufficient time so that oxygen and water vapor are flushed from the chamber. Fluorine is then added to the nitrogen flow so that a mixture of fluorine in nitrogen passes directly into the reactor vessel where it contacts the polymer gum. Failure to remove traces of oxygen and moisture from the vessel can result in the generation of acyl fluoride groups (and their carboxylic acid hydrolysis products) on the polymer backbone. Although not a preferred embodiment of the present invention, the generation of acyl fluoride groups may be advantageous under certain circumstances and is within the scope of the present invention.

Typical fluorination reaction parameters (i.e. fluorine and nitrogen flow rates, duration of reaction, etc.) will vary somewhat between different polymer gums. Specific reaction parameters chosen for the fluorination reaction will depend on several factors, including desired fluorine content of the product, type of polymer gum, size of reactor vessel, and surface area-to-volume ratio of the gum. Virtually any quantity of polymer gum may be fluorinated in any one single batch by the methods disclosed in this invention and is limited only by the capacity of the reactor vessel.

Following the completion of the fluorination process, the vessel is purged and the product removed. The scrubbing agent is removed, typically by dissolving it in warm water, and the fluorinated polymer is then collected by filtration. After drying the fluorinated gum, it is ready to be used.

Fluorinated elastomeric gums generated by the methods described in the present invention are particularly useful in applications where the performance of the precursor has been limited, for example, by its poor resistance to volume swell in certain fluids, or by its high friction characteristics in certain environments. Those skilled in the art will additionally recognize that there are numerous other potential applications of this invention. If these other beneficial applications follow the teachings of the present invention, such applications are within the scope of this invention.

Before an elastomeric gum can be used in a specific application, it is generally compounded into an elastomeric formulation specifically designed so that the resulting compound has desirable physical characteristics. An elastomeric formulation is typically a mixture of base polymer or polymers, fillers, plasticizers, curing agents, and other additives known to those skilled in the art of rubber chemistry. Fluorinated elastomeric gums generated by the inventive processes are suitable for use in elastomeric formulations, either as the sole elastomer or in combination with other gums.

The degree to which a given direct-fluorinated polymer gum may be cross-linked is controlled largely by the extent to which it has been fluorinated. Consequently, a highly direct-fluorinated polymer gum will have fewer available cross-linking sites than the same system with a lower degree of fluorination. Therefore, when a highly direct fluorinated polymer gum is compounded, allowances should be made in the formulation to compensate for the likely decrease in cross-linking sites. This may be done by routine experimentation by those skilled in the art, for example, by selecting alternative cure systems or cure conditions. It is also possible to blend highly direct-fluorinated gums with other gums, thereby increasing the number of available cross-linking sites. Those skilled in the art will recognize that direct-fluorinated polymer gums may also be incorporated into formulations not specifically designed to be cross-linked, or not requiring the generation of cross-links in order to possess desirable physical characteristics. The amount of fluorinated polymer gum included in such compositions may range from as little as a few tenths of a percent by weight up to 99 percent by weight.

A large number of polymer systems are amenable to modification by the methods of the present invention. Examples of commercially available polymer gums which have been found to exhibit improved physical properties after modification are listed below. These specific examples are intended only to illustrate features of the present invention and are not intended to represent a complete listing of suitable polymers. Polymers are referred to by their chemical names; trade names of these polymers are known to those skilled in the art and may be found, for example, in Rubber World Magazine's Blue Book (published annually by Lippincott and Peto, Inc.). In many cases, there is more than one supplier of the same elastomer. The list of suitable uncrosslinked polymers is as follows: Polybutadienes, isobutylene-isoprene elastomers, chlorinated polyethylenes, chlorosulfonated polyethylenes, polyepichlorohydrins, ethylene-acrylic elastomers, ethylene-propylene copolymers, ethylene-propylene-diene terpolymers, tetrafluoroethylene-propylene copolymers, vinylidene fluoride-hexafluoropropylene copolymers, vinylidene fluoride-tetrafluoroethylene-hexafluoropropy-lene-ethylene tetrapolymers, vinylidene fluoride-hexafluoropropylene-tetrafluoroethylene terpolymers, butadiene-acrylonitrile copolymers, polychloroprene, styrene-butadiene-acrylonitrile copolymers, carboxyl-modified butadiene-acrylonitrile copolymers, acrylonitrile-ethylene-butadiene terpolymers, polyurethanes, vinylidene fluoride-hexafluoropropylene-tetrafluoroethylene-bromotetrafluorobutene tetrapolymers, polypropylenes, copolyester elastomers, polyether elastomers and polyetherester elastomers.

The fluorinated polymer gums of the present invention may be compounded with a wide variety of additives including fillers, lubricants and plasticizers. Exemplary fillers include carbon black, silica, calcium carbonate, glass powder or glass fibers. The above listed additives are exemplary only and any other conventional additives may be used provided that they are compatible with the fluorinated polymer gums. The amount of particular additive used in compounding the final article will vary widely and will depend upon the final characteristics desired by the compounder. The desired levels of various additives are easily determined by one skilled in the art through routine experimentation.

Those skilled in the art will recognize that there exist numerous other uncross-linked elastomeric polymer gums which would be amenable to the present invention. Generally speaking, the suitability of any particular polymer gum to direct fluorination as described herein may be established through routine experimentation.

Examples of practice are as follows:
1. Fluorination Procedures

The procedure for the direct fluorination of exemplary polymer gums by the method of this invention is basically the same as other direct fluorination procedures. See, for example, U.S. Pat. No. 4,621,107, which discloses direct fluorination of certain cross-linked polymers. All reactions were typically performed at ambient temperature in a cylindrical brass reactor vessel having an internal volume of 25.0 liters. The vessel was mounted on a drive shaft which permitted end-to-end rotation of the vessel, sufficient to thoroughly agitate the polymer gum during the fluorination procedure.

The uncross-linked polymer gums were ground up prior to starting the fluorination process in order to increase the efficiency of the process. As previously discussed, the size of gum particles affects the rate of the fluorination reaction and also the extent to which a given gum may be fluorinated. Factors affecting the size of gum particles include the type of gum, its molecular weight, viscosity, grinding method, and grinding temperature. Generally, low molecular weight and low viscosity elastomers form larger particulates because of their tendency to agglomerate after grinding. The effect of gum particle size and distribution on the rate of the reaction with fluorine and/or the degree of fluorination should be established by routine experimentation. For these examples, the particle sizes of the gum particles typically ranged from 100 to 800 microns.

The fluorination reaction must be performed under carefully controlled conditions so that fluorination of the gum is achieved without significant scission of the polymer backbone. Once the requisite amount of gum and scavenger has been loaded into the vessel, the vessel is thoroughly purged and filled with nitrogen. Fluorine gas is then added to the nitrogen flow, initially at very low levels, so that a mixture of fluorine in nitrogen passes into the rotating reactor chamber. Over a period of time, the proportion of fluorine in the process gas mixture is gradually increased, either by decreasing the carrier gas flow or increasing the fluorine flow or both. If so desired, the reaction may ultimately be carried out in 100% fluorine.

Typical fluorination reaction parameters (i.e. fluorine and nitrogen flow rates, duration of reaction, etc.) can vary considerably between polymer systems and will also depend on the level of fluorination required in the product. To illustrate this, reaction parameters used to generate different levels of fluorination in two separate polymer systems are presented in Table 1 and Table 2. In Table 1, the conditions used to generate fluorinated ethylene-propylene-diene polymers having fluorine contents of around 100–130 wt. %, starting from 3–400 g. of unfluorinated gum, are presented. Table 2 illustrates typical reaction conditions used when generating fluorinated tetrafluoroethylene-propylene polymers with 35–45 wt. % fluorine added, starting from approximately 1,000 g. of polymer.

TABLE 1

REACTION PARAMETERS USED TO GENERATE FLUORINATED EPDM GUMS CONTAINING 100–130 WT % ADDED FLUORINE

| FLUORINE FLOWRATE (SCC/MIN) | NITROGEN FLOWRATE (SCC/MIN) | % $F_2$ | TIME (HOURS) |
|---|---|---|---|
| 0 | 1500 | 0 | 2 |
| 50 | 200 | 20 | 12 |
| 100 | 200 | 33 | 12 |
| 150 | 180 | 45 | 16 |
| 180 | 150 | 54 | 16 |
| 200 | 100 | 67 | 16 |
| 100 | 30 | 77 | 16 |
| 0 | 1500 | 0 | 2 |

TABLE 2

REACTION PARAMETERS USED TO GENERATE FLUORINATED TFEP GUMS CONTAINING 35–45 WT. % ADDED FLUORINE

| FLUORINE FLOWRATE (SCC/MIN) | NITROGEN FLOWRATE (SCC/MIN) | % $F_2$ | TIME (HOURS) |
|---|---|---|---|
| 0 | 1000 | 0 | 4 |
| 75 | 200 | 27 | 60 |
| 100 | 200 | 33 | 8 |
| 100 | 150 | 40 | 16 |
| 125 | 125 | 50 | 8 |
| 0 | 1000 | 0 | 4 |

2. Test Procedures

Fluorinated polymer gums generated according to the methods of this invention were formulated into test articles and then analyzed by a number of techniques. These techniques are summarized as follows:

A) Tensile Testing

The mechanical behavior of an elastomer, that is, its deformation and flow characteristics under stress, can be characterized by its stress/strain properties. Important quantities which define the mechanical behavior of an elastomer include its 100% Modulus, tensile strength, Young's Modulus, and 100% elongation. These properties are, collectively, referred to as the "tensile properties" of an elastomer.

The moduli, tensile strength, and elongation of all samples were determined as described in ASTM D412 or ASTM D1708 using an Instron Model 4204 Tensile Tester.

B) Coefficient of Friction Testing

Static and dynamic coefficients of friction were measured as described in ASTM D1894 using a Testing Machines Inc. Monitor/Slip and Friction fixture which conforms to the ASTM specification. The test fixture determines friction coefficients by pulling a metal sled (to which the sample is mounted) of fixed weight (200 g.) across a stainless steel plane (surface finish 6–10 RMS). In all cases, samples were pulled at a constant speed of 5"/min. for a distance of 3".

C) Infrared (IR) Analysis

The infrared analysis of samples was performed as described in ASTM D2702 using a Nicolet Model 510P FTIR Spectrometer.

Since the different functional groups present in any particular material absorb IR radiation at certain characteristic frequencies, a plot of the infrared spectrum will identify the chemical groups present in that material. Of particular interest are the absorption frequencies of carbon-hydrogen and carbon-fluorine bonds. Carbon-hydrogen bonds strongly absorb IR radiation at relatively short wavelengths, typically around 3,000 cm$^{-1}$, whereas carbon-fluorine bonds have a characteristic absorption at much longer wavelengths, typically around 1,100 cm$^{-1}$.

FTIR spectra were obtained by using the Attenuated Total Reflectance (ATR) technique which has been described elsewhere (see, for example, Mirabella, F. M. and Harrick, N. J., "Internal Reflection Spectroscopy: Review and Supplement" (1985), the pertinent portions of which are incorporated herein by reference). This is a technique ideally suited to the IR analysis of opaque materials.

The fluorination of a sample is indicated by the appearance of characteristic absorption in the 1100 cm$^{-1}$ region of its IR spectrum. If these absorptions appear with a concomitant loss of peaks characteristic of carbon-hydrogen bonds, the replacement of hydrogen by fluorine in the sample is indicated.

D) Fluid Permeability Resistance

Elastomeric materials have a tendency to swell when immersed in certain fluids. This can limit the usefulness of elastomers subject to high levels of swell in certain applications. The fluorination of a given elastomer can have a significant effect on its swell by altering the elastomer's chemical resistance. This is a direct consequence of the formation of carbon-fluorine bonds on the polymer backbone during the inventive process. The change in chemical resistance may be assessed through fluid immersion testing. Fluid immersion tests have been carried out in various test fluids using the methods described in ASTM D471.

3. Sample Preparation

A number of commercially available polymer gums were used as starting materials in order to demonstrate the scope of the present invention. Generally speaking, elastomers are usually formulated with carbon black, plasticizers, curing agents, and other additives known to those skilled in the art of rubber chemistry, so that the resulting compound has desirable physical characteristics. For the purposes of these examples, however, fluorinated polymer gums and their non-direct fluorinated precursors were formulated using gum and cure system only. This was to allow the differences between gums before and after fluorination to be observed directly without the potential interference of other interactions.

Once formulated, gums were compression molded into standard 6"×6" tensile sheets (approximate thickness 0.10±.020") using the cure conditions presented in Table 3. Samples for physical testing were then taken from the tensile sheets using the appropriate ASTM die.

4. Elastomers used as Starting Materials

Commercially available polymer gums were used in all examples. As discussed above, polymers were formulated using gum and cure system only. The choice of cure system and cure cycle was made according to manufacturer recommendations for each polymer. A listing of polymer gums used to illustrate this invention, cure systems used, and cure conditions are presented in Table 3. Polymers are designated by suppliers' trade mark in all cases.

TABLE 3

Polymer Gums, Cure Systems and Cure Conditions used to Generate Test Samples

| Polymer Gum | Type | Cure system[1] | Cure Conditions |
|---|---|---|---|
| Chemigum ® N917[2,6] | Acrylonitrile-butadiene | 7 parts DiCup ®[10] 40KE | 12' @ 350° F. |
| Nordel ® 1040, 2760[3,7] | Ethylene-propylene-diene | 8 parts DiCup ®[10] 40C | 10' @ 350° F. |
| Aflas ® FA100H[4,8] | Tetrafluoroethylene-propylene | 10 parts TAIC[10] | 6' @ 370° F. |
| | | 5 parts VulCup ® 40KE | Post-Cured 6 hr. @ 480° F. |
| Tecnoflon ® BRX915N[9] | Vinylidene fluoride-tetrafluoroethylene-hexafluoropropylene-ethylene | 3 parts Luperco ® 101XL[11] 4 parts TAIC (75% dis.) | 10' @ 340° F. Post-Cured 24 hr @ 450° F. |
| Neoprene ® W[7] | Polychloroprene | 4 parts magnesium oxide 5 parts zinc oxide 1 part sulfur 1.5 parts TMTS | 15' @ 325° F. |
| Hypalon ® 20[7] | Chlorosulfonated polyethylene | 4 parts magnesium oxide 1 part sulfur 2 parts TMTD | 15' @ 325° F. |
| Viton ® A-500[5,7] | Vinylidene fluoride-hexafluoropropylene | 3 parts magnesium oxide 6 parts calcium hydroxide 2.5 parts Viton ® Cure #50 | 10' @ 370° F. Post-Cured 24 hr @ 450° F. |
| Viton ® VT-R-7025[7] | Vinylidene fluoride-hexafluoropropylene-tetrafluoroethylene-bromotetrafluorobutene | 3 parts calcium hydroxide 1 part Viton ® Process Aid #3 2 parts Diak #8 4 parts Luperco ® 101XL[11] | 10' @ 350° F. Post-Cured 24 hr @ 450° F. |

[1]All based on 100 parts polymer gum.
[2]Fluorinated samples formulated from 75 parts fluorinated gum, 25 parts standard Chemigum ® N917.
[3]Fluorinated samples formulated from 75 parts fluorinated gum, 25 parts standard Nordel ®.
[4]Fluorinated samples formulated from 60 parts direct fluorinated gum, 40 parts standard Aflas ® FA100H.
[5]Fluorinated samples formulated from 80 parts direct fluorinated gum, 20 parts standard Viton ® A-500.
[6]Registered trademark of Goodyear Tire and Rubber Co., Akron, OH.
[7]Registered trademark of E.I. DuPont de Nemours and Co., Wilmington, DE.
[8]Registered trademark of Asahi Glass Co., Japan.
[9]Registered trademark of Ausimont U.S.A., Morristown, NJ.
[10]Registered trademark of Hercules, Inc., Wilmington, DE.
[11]Registered trademark of AtoChem North America, Inc., Buffalo, NY.

All samples were mill-mixed using standard mixing procedures known to those skilled in the art of rubber chemistry. Samples prepared from fluorinated Chemigum ® N917, Nordel ® 1040 and 2760, Aflas ® FA100H and Viton ® A-500 were co-blended on the mill with portions of standard precursor gum, as indicated in Table 3. Co-blending with the precursor in these examples facilitated the mixing process and afforded a more thorough mixture, important for obtaining reproducible data. The use of alternative mixing processes, especially internal mixing, would likely negate the need to co-blend in the above examples.

Allowances were made in the formulation of the fluorinated gums for the significant increases in weight, especially at high levels of fluorination, resulting from the inventive process. This increase in weight is a direct consequence of the substitution of hydrogen atoms (atomic weight 1.008) on the polymer backbone by fluorine atoms (atomic weight 18.998).

5. Physical Characteristics of Starting Materials

Original physical properties of the starting materials are presented in Table 4. All data was accumulated according to standard ASTM procedures as discussed in the Test Procedures.

TABLE 4

| POLYMER GUM | TENSILE[1] (psi) | ELONGATION[1] (%) | 100% MODULUS[1] (psi) | YOUNG'S MODULUS (psi) | HARDNESS[2] (SHORE A) | FRICTION COEFFICIENT STATIC | FRICTION COEFFICIENT DYNAMIC |
|---|---|---|---|---|---|---|---|
| Chemigum ® N917 | 220 | 40 | — | 700 | 65 | 6.40 ± .45 | 4.48 ± .40 |
| Nordel ® 1040 | 210 | 200 | 140 | 360 | 45 | 6.35 ± .25 | 4.45 ± .45 |
| Nordel ® 2760 | 580 | 220 | 280 | 1040 | 70 | 5.06 ± .27 | 3.83 ± .16 |
| Aflas ® FA100H | 1900 | 420 | 200 | 560 | 70 | 4.53 ± .17 | 3.79 ± .16 |
| Tecnoflon ® BRX915N | 1340 | 460 | 150 | 400 | 60 | 3.10 ± .08 | 2.67 ± .16 |
| Neoprene ® W | 3000 | 1100 | 180 | 850 | 65 | 3.03 ± .18 | 2.35 ± .16 |
| Hypalon ® 20 | 960 | 450 | 130 | 320 | 45 | 5.05 ± .45 | 4.15 ± .20 |
| Viton ® A-500 | 1200 | 320 | 200 | 440 | 55 | 4.09 ± .16 | 3.17 ± .21 |
| Viton ® VT-R-7025 | 1780 | 480 | 150 | — | 57 | 4.56 ± .14 | 3.84 ± .16 |

[1]Measured according to ASTM D1415.
[2]Per ASTM D412/ASTM D1708

6. Results

A. Degree of Fluorination.

Polymer gums were modified by the methods of this invention to form fluorinated gums containing various levels of added fluorine. Table 5 summarizes the weight analysis of the gums before and after fluorination.

TABLE 5

Weight Analysis of Polymer Gums Before and After Fluorination

| Polymer Gum | Weight Before Fluorination (g.) | Weight After Fluorination (g.) | Approx Fluorine Added (Wt. %) |
|---|---|---|---|
| Chemigum ® N917 | 850 | 1120 | 32 |
| | 500 | 736 | 50 |
| | 300 | 540 | 80 |
| | 250 | 551 | 120 |
| Nordel ® 1040 | 300 | 575 | 92 |
| Nordel ® 2760 | 425 | 620 | 46 |
| | 320 | 650 | 105 |
| Aflas ® FA100H | 1006 | 1215 | 21 |
| | 994 | 1390 | 40 |
| Tecnoflon ® BRX915N | 1064 | 1130 | 6 |
| | 315 | 348 | 10 |
| Neoprene ® W | 300 | 370 | 23 |
| | 350 | 485 | 39 |
| | 320 | 546 | 70 |
| Hypalon ® 20 | 300 | 398 | 33 |
| | 310 | 460 | 48 |
| Viton ® A-500 | 310 | 336 | 8 |
| | 300 | 342 | 13 |
| Viton ® VT-R-7025 | 302 | 324 | 7 |

These fluorinated gums were then formulated and compression-molded into slabs as summarized in Table 3.

B. Coefficients of Friction

Static and dynamic coefficients of friction for all test samples were measured according to ASTM D1894. Results of these tests are presented in Table 6.

TABLE 6

Static and Dynamic Coefficients of Friction of Fluorinated Polymer Gums

| Polymer Gum | Approx Fluorine Added (Wt. %) | Static Friction Coefficient | Dynamic Friction Coefficient |
|---|---|---|---|
| Chemigum ® N917 | 32 | 1.40 ± .08 | 1.32 ± .06 |
| | 50 | 1.29 ± .05 | 1.15 ± .06 |
| | 80 | 0.68 ± .04 | 0.63 ± .04 |
| | 120 | 0.54 ± .01 | 0.47 ± .02 |
| Nordel ® 1040 | 92 | 1.39 ± .03 | 1.19 ± .02 |
| Nordel ® 2760 | 46 | 2.08 ± .07 | 1.70 ± .07 |
| | 105 | 1.36 ± .06 | 1.02 ± .05 |
| Aflas ® FA100H | 21 | 2.45 ± .09 | 2.12 ± .09 |
| | 40 | 1.51 ± .04 | 1.27 ± .04 |
| Tecnoflon ® BRX915N | 6 | 2.65 ± .06 | 2.43 ± .11 |
| | 10 | 2.28 ± .06 | 1.90 ± .05 |
| Neoprene ® W | 23 | 2.28 ± .06 | 1.74 ± .08 |
| | 39 | 1.67 ± .03 | 1.42 ± .03 |
| | 70 | 0.59 ± .03 | 0.44 ± .01 |
| Hypalon ® 20 | 33 | 2.85 ± .09 | 2.43 ± .10 |
| | 48 | 1.97 ± .06 | 1.65 ± .04 |
| Viton ® A-500 | 8 | 3.44 ± .08 | 2.97 ± .08 |
| | 13 | 2.45 ± .05 | 1.99 ± .03 |
| Viton ® VT-R-7025 | 7 | 3.70 ± .03 | 2.90 ± .07 |

Static and dynamic friction coefficients for the starting materials are presented in Table 4. Comparison of these values with the results presented in Table 6 indicates that, in all cases, the fluorinated polymer gums exhibit significantly reduced friction coefficients relative to the starting materials.

These results also indicate a marked correlation between the weight percentage of fluorine added to the polymer gum and its static and dynamic friction coefficients, i.e., for a given polymer, the greater the degree of fluorination, the lower the coefficients of friction.

C. Tensile Testing

All tensile testing was performed in accordance with ASTM D412 or with ASTM D1708 using an Instron Model 4204 Tensile Tester. Test results are presented in Table 7.

TABLE 7

Tensile Properties of Fluorinated Polymer Gums[1]

| Polymer Gum | Approx. Fluorine Added (wt %) | Tensile (psi) | Elongation (%) | 100% Modulus (psi) | Youngs Modulus (psi) | Hardness[2] (Shore A) |
|---|---|---|---|---|---|---|
| Chemigum ® N917 | 32 | 840 | 60 | — | 2000 | 81 |
| | 50 | 1000 | 50 | — | 2650 | 84 |
| | 80 | 1580 | 40 | — | 7470 | 91 |
| | 120 | 1790 | 30 | — | 15250 | 96 |
| Nordel ® 1040 | 92 | 310 | 110 | 300 | 1050 | 58 |
| Nordel ® 2760 | 46 | 1265 | 170 | 960 | 4300 | 88 |
| | 105 | 920 | 70 | — | 13100 | 93 |

TABLE 7-continued

Tensile Properties of Fluorinated Polymer Gums[1]

| Polymer Gum | Approx. Fluorine Added (wt %) | Tensile (psi) | Elongation (%) | 100% Modulus (psi) | Youngs Modulus (psi) | Hardness[2] (Shore A) |
|---|---|---|---|---|---|---|
| Aflas ® | 21 | 1300 | 265 | 530 | 2020 | 83 |
| FA100H | 40 | 1350 | 125 | 1260 | 3800 | 94 |
| Tecno- | 6 | 830 | 220 | 240 | 580 | 65 |
| flon ® | 10 | 920 | 250 | 240 | 620 | 67 |
| BRX915N | | | | | | |
| Neoprene ® | 23 | 1100 | 760 | 210 | 940 | 70 |
| W | 39 | 600 | 380 | 400 | 2275 | 72 |
| | 70 | 560 | 30 | — | 7250 | 90 |
| Hypalon ® | 33 | 630 | 485 | 220 | 725 | 60 |
| 20 | 48 | 330 | 350 | 210 | 1480 | 77 |
| Viton ® | 8 | 1250 | 245 | 260 | 355 | 60 |
| A-500 | 13 | 1350 | 290 | 240 | — | 65 |
| Viton ® VT-R-7025 | 7 | 1300 | 440 | 180 | 580 | 60 |

[1]Formulations per Table 3.
[2]Per ASTM D1415

Tensile data for the starting materials is presented in Table 4. Comparison of these values with the results presented in Table 7 indicates some significant differences between the tensile properties of the fluorinated gums and their precursors.

The hardness values for the fluorinated gums were generally much higher than those of their precursors. This was true for all polymer gums studied. Additionally, the hardness of all fluorinated gums increased as the weight percentage of added fluorine increased. However, even for relatively small weight percentages of added fluorine for instance, (less than 20%, say) increases in hardness of up to 13 points were observed.

For Chemigum ® N917, Nordel ® 1040, and Nordel ® 2760, fluorination of the polymer gum resulted in a marked increase in tensile strength, even at relatively low levels of fluorination. Increasing the level of fluorination resulted in further significant increases in tensile strength for Chemigum ® N917 only.

For the remaining systems studied, fluorination decreases both tensile strength and elongation somewhat. Here, increasing the level of fluorination generally resulted in further decreases in these properties. Nevertheless, it is apparent from these results that a reasonable state of cure was achieved in all samples. Those skilled in the art of rubber chemistry will additionally recognize that many of these properties could be significantly improved through routine experimentation.

The fluorination process had a dramatic effect on both Young's and 100% Modulus values, causing significant increases in these parameters in all of the exemplary gums. This was especially apparent for Nordel ® 2760, Neoprene ® W, and Chemigum ® N917 (which displayed a 25-fold increase in Young's Modulus at the highest level of fluorination studied) where a dramatic modulus reinforcement was observed. The fluorinated polymer gums of the present invention may be used as modulus reinforcers in elastomer formulations, if desired.

D. Infrared Analysis

Infrared analysis of all polymer gums before and after exposure to fluorine were made with a Nicolet Model 510P FTIR Spectrometer using the ATR technique described previously.

The infrared spectra of all polymer gums after fluorination by the methods of this invention were characterized by a broad, relatively intense absorption centered around 1,100 wavenumbers. This absorption frequency is characteristic of the carbon-fluorine bond; its presence indicates that fluorination of the polymer backbone has taken place.

The appearance of the absorption frequency at 1,100 wavenumbers always occurred with the simultaneous decrease in the intensity of the strong absorption frequency centered around 3,000 wavenumbers, observed in the IR spectra of all polymer gums studied prior to fluorine exposure. It is well documented that carbon-hydrogen bonds absorb IR radiation at around 3,000 wavenumbers. In some systems, particularly those having relatively high weight percentages of added fluorine, this carbon-hydrogen absorption was very much reduced indicating the replacement of a significant proportion of the hydrogen atoms on the polymer backbone by fluorine atoms.

Figure 2:
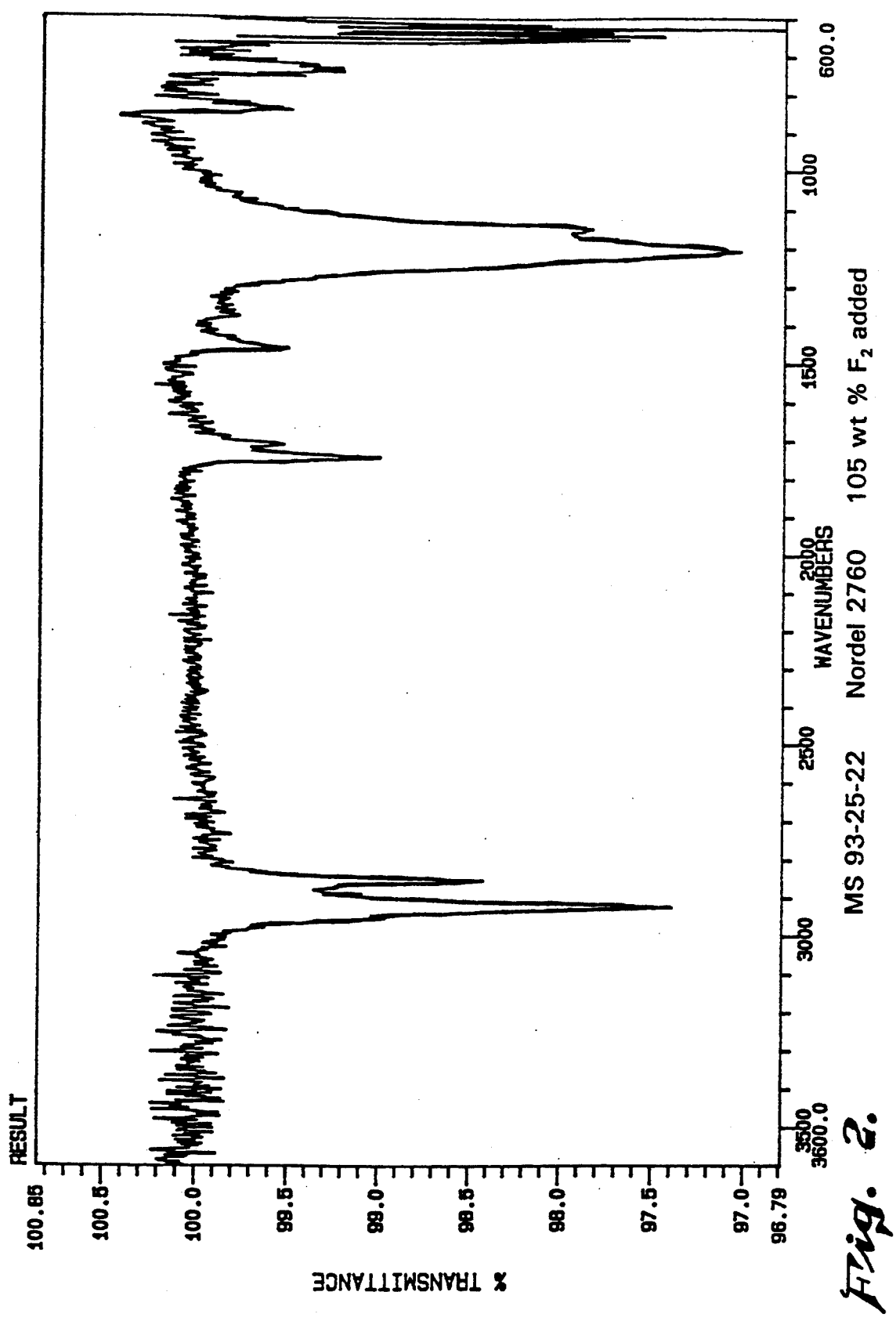
FIG. 2 is an infra-red spectra of the EPDM polymer after the polymer has been fluorinated in accordance with the present invention.
Figure 3:
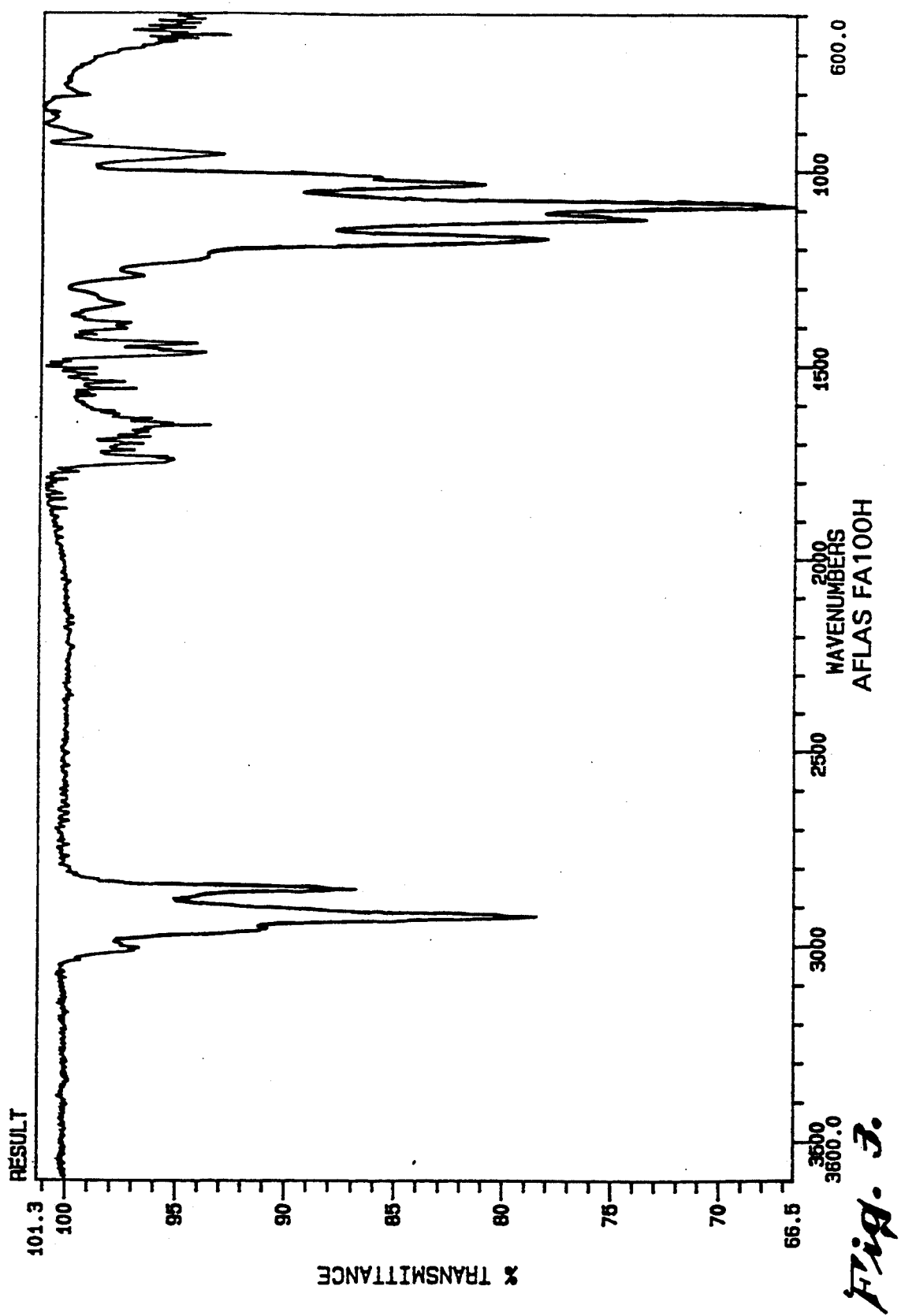
FIG. 3 is an infra-red spectra of an uncross-linked tetrafluoroethylene propylene (TFEP) polymer gum prior to fluorination in accordance with the present invention.
Figure 4:
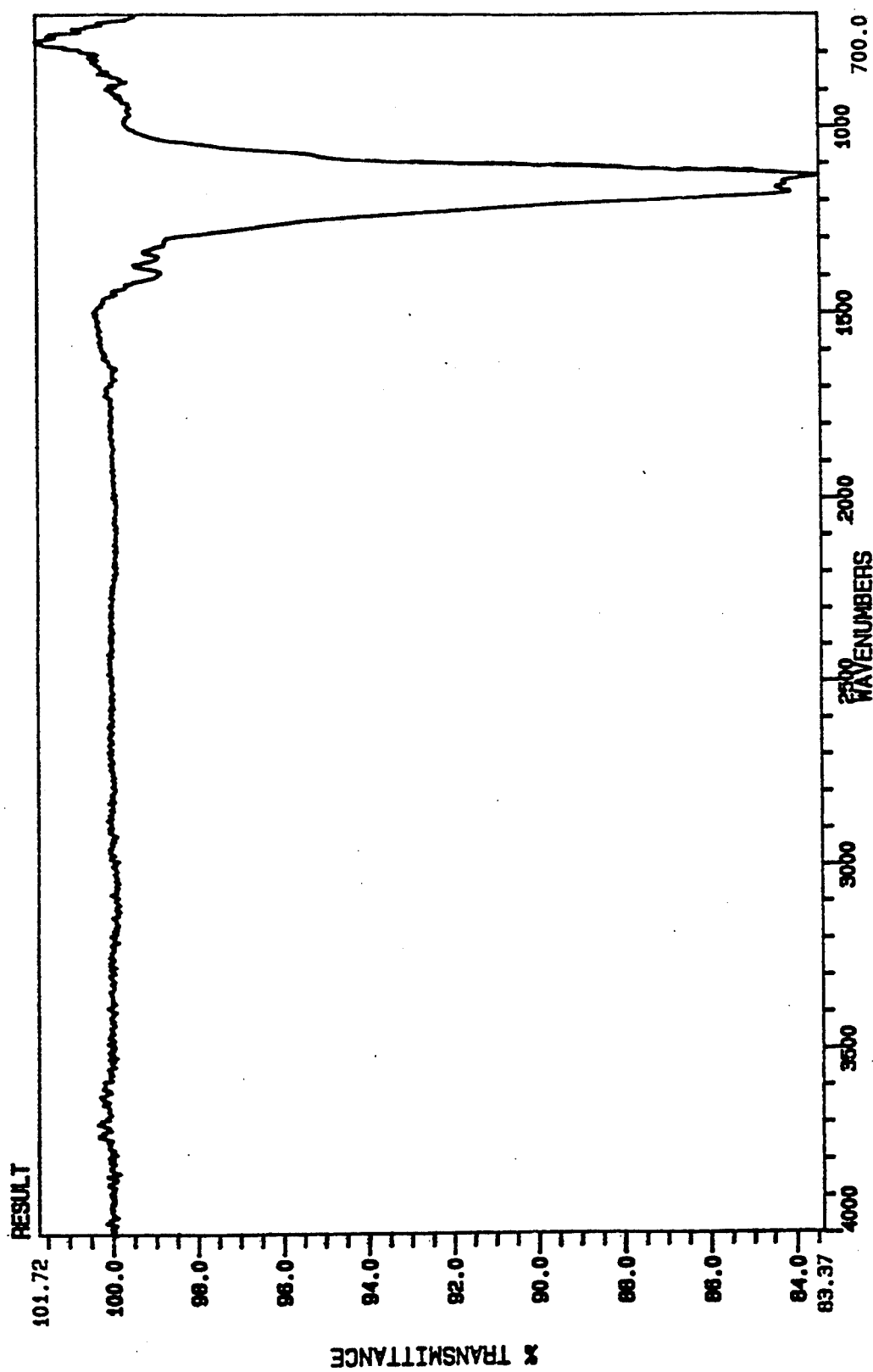
FIG. 4 is an infra-red spectra of the TFEP polymer after the polymer has been fluorinated in accordance with the present invention.

The FTIR spectra of two representative polymer gums (Nordel ® 2760 and Aflas ® FA100H) taken prior to and after exposure to fluorine are presented in FIGS. 1 through 4. FIGS. 1 and 3 are the spectra for Nordel ®2760 and Aflas ® FA100H, respectively, prior to exposure. FIGS. 2 and 4 are the spectra for the same two polymer gums after direct fluorination in accordance with the present invention.

E. Fluid Permeability Resistance

The ability of fluorinated and non-fluorinated polymer gums to withstand swelling when immersed in selected test fluids was evaluated as described in ASTM D471. Fluorinated and non-fluorinated polymer gums were formulated and compression-molded into test slabs as described in Sections 3 and 4. Specimens for testing were cut from these slabs using a ASTM "Microtensile" dumbbell die.

All immersion tests were performed at 250° F. and were of 70 hours duration. All samples were evaluated, separately, in two different test fluids. All samples, with the exception of Viton A-500 and Viton ® VT-R-7025, were tested in Skydrol ® 500B-4 (phosphate ester-based hydraulic fluid) and in ASTM Oil #3. The Viton ® samples were tested in Skydrol ® 500B-4 and in brake fluid. The results of the fluid immersion tests are presented in Table 8.

TABLE 8

VOLUME SWELL OF POLYMER GUMS AFTER IMMERSING IN TEST FLUID FOR 70 HOURS AT 250° F.

| Polymer Gum | Approx.[1] Fluorine Added(wt %) | VOLUME SWELL (%) Skydrol 500B-4 | ASTM Oil #3 | Brake Fluid |
|---|---|---|---|---|
| Chemigum ® N917 | 0 | 120 | 35 | — |
|  | 32 | 96 | 24 | — |
|  | 50 | 77 | 22 | — |
|  | 80 | 56 | 15 | — |
|  | 120 | 46 | 11 | — |
| Nordel ® 1040 | 0 | 14 | 201 | — |
|  | 92 | 8 | 103 | — |
|  | 0 | 16 | 147 | — |
| Nordel ® 2760 | 46 | 15.5 | 99 | — |
|  | 105 | 15 | 46 | — |
|  | 0 | 23 | 12 | — |
| Aflas ® FA100H | 21 | 25 | 9 | — |
|  | 40 | 25 | 5 | — |
| Tecnoflon ® BRX915N | 0 | 71 | 1.5 | — |
|  | 6 | 64 | 1.2 | — |
|  | 10 | 55 | 1.0 | — |
| Neoprene ® W | 0 | >800 | 210 | — |
|  | 23 | 390 | 143 | — |
|  | 39 | 256 | 82 | — |
|  | 70 | 120 | 31 | — |
| Hypalon ® 20 | 0 | 530 | 240 | — |
|  | 33 | 370 | 215 | — |
|  | 48 | 210 | 128 | — |
| Viton ® A-500 | 0 | 290 | — | 36 |
|  | 8 | 300 | — | 29 |
|  | 13 | 280 | — | 26 |
| Viton ® VT-R-7025 | 0 | 270 | — | 20 |
|  | 7 | 320 | — | 17 |

[1]"Approx. Fluorine Added = 0 Wt. %" Correspond to standard polymer gum.

For the majority of samples evaluated, it is apparent from these results that fluorination of the polymer gum greatly enhanced the ability of the gum to resist swelling in the test fluids used. The higher the weight percentage of added fluorine, the greater the improvement in chemical resistance. This was true for the majority of systems for immersion in both Skydrol ® 500B-4 and ASTM Oil #3. Impressive results were obtained with fluorinated Neoprene ® W, where significant reductions in volume swell were observed in both test fluids even at relatively low weight percentages of added fluorine. Similarly impressive results were obtained with fluorinated Chemigum ® N917, Nordel ® 1040 and 2760, and at least in ASTM Oil #3, Aflas ® FA100H. These results are even more impressive in light of the fact that, as discussed in Section 4, all these test samples contained from 25 to 40 PHR standard precursor gum in their formulations. Better mixing techniques would be expected to further enhance the use of the fluorinated gums in accordance with the present invention by negating the need to co-blend certain of the fluorinated gums with their precursors.

The soak results obtained with both modified Viton ® samples in Skydrol ® 500B-4, showed little, if any, improvement over the starting materials. However, it is possible in these systems that, during the fluorination process, sufficient cross-linking sites were removed from the polymer backbone to significantly decrease the cross-link density in the compression-molded test samples, thereby accounting for the observed soak data. The use of more reactive cure systems would be expected to improve the results of soak tests in solvents.

The following are further examples of the present invention:

Preparation of Fluorinated Neoprene ® W Gum Having Approximately 70 Weight Percent Added Fluorine.

To a cylindrical brass reactor vessel, internal volume 25-liters, was charged anhydrous sodium fluoride powder (800 g.) and Neoprene ® W gum (320 g.). The Neoprene ® gum had first been cryogenically pulverized and then sifted using a no. 35 sieve, so that only the gum particles of approx. 0.02" in size or smaller were deposited into the reactor. The vessel was sealed and then tumbled end-over-end at about 5 rpm. After purging the vessel with UHP nitrogen (flowrate ca. 1500 scc/min) for about 2 hours, the fluorination process was initiated. Flowrates were maintained as follows:

| Fluorine Flowrate (scc/min) | Nitrogen Flowrate (scc/min) | Time (hours) |
|---|---|---|
| 160 | 110 | 18 |
| 200 | 100 | 6 |
| 120 | 20 | 50 |
| 150 | 20 | 24 |
| 0 | 1500 | 2 |

After completing the fluorination process and thoroughly purging, the vessel was opened and the contents removed. The crude product was washed repeatedly with warm water to remove all the sodium fluoride/sodium bifluoride and was then air-dried at 70° F for 24 hours. The fluorinated gum weighed 540 g.

Preparation of Fluorinated Viton ® A-500 Gum Having Approximately 13 Weight Percent Added Fluorine.

To a cylindrical brass reactor vessel, internal volume 25-liters, was charged anhydrous sodium fluoride powder (600 g.) and Viton ® A-500 gum (300 g.). The Viton ® gum had first been ground on a mill to a particle size of about 500 mesh. The vessel was sealed, purged, and tumbled end-over-end as in the previous example. The gum was then fluorinated as follows:

| Fluorine Flowrate (sec/min) | Nitrogen Flowrate (sec/min) | Time (hours) |
|---|---|---|
| 180 | 180 | 8 |
| 180 | 90 | 8 |
| 180 | 60 | 8 |
| 180 | 20 | 24 |
| 180 | 0 | 24 |
| 0 | 1500 | 2 |

After completing the fluorination process and thoroughly purging, the vessel was opened and the contents removed. The crude product was washed repeatedly with warm water to remove all the HF scavenger and was then air-dried at 70° C. for 24 hours. The fluorinated product weighed 340 g.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A method for producing a fluorinated gum comprising the steps of:

providing polymer gum in a particulate form, said polymer gum consisting essentially of uncross-linked polymers having a plurality of reactive sites, said uncross-linked polymers being selected from the group consisting of polybutadienes, isobutylene-isoprene elastomers, chlorinated polyethylenes, chlorosulfonated polyethylenes, polyepichlorohydrins, ethylene-acrylic elastomers, ethylene-propylene copolymers, ethylene-propylene-diene terpolymers, tetrafluoroethylene-propylene copolymers, vinylidene fluoride-hexafluoropropylene copolymers, vinylidene fluoride-tetrafluoroethylene-hexafluoropropylene-ethylene tetrapolymers, vinylidene fluoride-hexafluoropropylene-tetrafluoroethylene terpolymers, butadiene-acrylonitrile copolymers, polychloroprene, styrene-butadiene-acrylonitrile copolymers, carboxy-modified butadiene-acrylonitrile copolymers, acrylonitrile-ethylene-butadiene terpolymers, polyurethanes, vinylidene fluoride-hexafluoropropylene-tetrafluoroethylene-bromotetrafluorobutene tetrapolymers, polypropylenes, copolyester elastomers, polyether elastomers and polyether-ester elastomers; and treating said polymer gum in particulate form with a sufficient amount of fluorine for a sufficient time under conditions sufficient to fluorinate at least a portion of said reactive sites to provide a fluorinated gum.

2. A method for producing a fluorinated gum according to claim 1 wherein said polymer gum is treated with fluorine in the presence of a hydrogen fluoride scavenger.

3. A method for producing a fluorinated gum according to claim 1 wherein said polymer gum is finely divided prior to said treatment with fluorine.

4. A method for producing a fluorinated gum according to claim 3 wherein a hydrogen fluoride scavenger is mixed with said finely divided polymer gum prior to said treatment with fluorine.

5. A method for producing a fluorinated gum according to claim 1 wherein said polymer is treated with a sufficient amount of fluorine for a sufficient time to add at least 5 weight percent fluorine to said polymer gum.

6. A method for producing a fluorinated gum according to claim 1 wherein said polymer gum is treated with a sufficient amount of fluorine for sufficient time to fluorinate substantially all of said reactive sites.

* * * * *

UNITED STATES PATENT AND TRADEMARK OFFICE
CERTIFICATE OF CORRECTION

PATENT NO. : 5,422,404
DATED : June 6, 1995
INVENTOR(S) : Zielinski et al.

It is certified that error appears in the above-indentified patent and that said Letters Patent is hereby corrected as shown below:

On the title page of the patent -

Below "United States Patent [19]," the inventor's name should be spelled --Zielinski et al.--

At item [75] the last name of the first inventor should be spelled --Zielinski--

Signed and Sealed this

Thirty-first Day of October 1995

Attest:

BRUCE LEHMAN

Attesting Officer

Commissioner of Patents and Trademarks